United States Patent
Park

(10) Patent No.: US 9,669,302 B2
(45) Date of Patent: Jun. 6, 2017

(54) DIGITAL IMAGE PROCESSING APPARATUS AND CONTROLLING METHOD THEREOF

(71) Applicant: LG ELECTRONICS INC., Seoul (KR)

(72) Inventor: Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 14/448,353

(22) Filed: Jul. 31, 2014

(65) Prior Publication Data

US 2016/0005199 A1    Jan. 7, 2016

(30) Foreign Application Priority Data

Jul. 4, 2014 (KR) .................. 10-2014-0083615

(51) Int. Cl.
*G09G 5/12* (2006.01)
*A63F 13/216* (2014.01)
*A63F 13/65* (2014.01)

(52) U.S. Cl.
CPC ............ *A63F 13/216* (2014.09); *A63F 13/65* (2014.09)

(58) Field of Classification Search
CPC ...................................... G06T 11/60
USPC ........................................ 345/633
See application file for complete search history.

(56) References Cited

U.S. PATENT DOCUMENTS

| | | | | |
|---|---|---|---|---|
| 5,402,117 A | * | 3/1995 | Zijderhand | G08G 1/096827 340/905 |
| 7,583,275 B2 | * | 9/2009 | Neumann | G06T 17/00 345/419 |
| 7,995,076 B2 | * | 8/2011 | Emam | G02B 27/017 345/629 |
| 8,502,864 B1 | * | 8/2013 | Watkins | G03B 35/00 348/52 |
| 9,013,505 B1 | * | 4/2015 | Thornton | G09G 5/36 345/419 |
| 2002/0103597 A1 | * | 8/2002 | Takayama | G01C 21/34 701/431 |

(Continued)

FOREIGN PATENT DOCUMENTS

EP      0608113 A2    7/1994

*Primary Examiner* — Javid A Amini
(74) *Attorney, Agent, or Firm* — Birch, Stewart, Kolasch & Birch, LLP

(57) ABSTRACT

A digital image processing apparatus and a controlling method thereof are disclosed. The digital image processing apparatus includes an input unit configured to receive information on a real travel path, a sensor unit configured to detect position change information of the digital image processing apparatus, a display unit configured to play a scene image of a virtual travel path, and a controller configured to control the input unit, the sensor unit, and the display unit, wherein the controller may detect similarity levels of virtual travel paths in accordance with a predetermined reference based upon the real travel path, select one virtual travel path respective to a highest similarity level among the detected similarity levels or respective to a user selection, and control the play of a scene image of the selected virtual travel path based upon the information on the real travel path and the detected position change information.

13 Claims, 12 Drawing Sheets

(56) References Cited

U.S. PATENT DOCUMENTS

| | | | | |
|---|---|---|---|---|
| 2005/0046953 | A1* | 3/2005 | Repetto | G02B 27/017 359/630 |
| 2005/0182295 | A1* | 8/2005 | Soper | A61B 1/0008 600/117 |
| 2007/0150188 | A1* | 6/2007 | Rosenberg | G01C 21/3647 701/431 |
| 2008/0221745 | A1* | 9/2008 | Diamandis | A63K 3/00 701/3 |
| 2009/0213112 | A1* | 8/2009 | Zhu | G06T 15/06 345/419 |
| 2009/0231146 | A1 | 9/2009 | Fujita | |
| 2010/0060648 | A1* | 3/2010 | Carter | A63F 13/12 345/474 |
| 2010/0096491 | A1* | 4/2010 | Whitelaw | A63K 3/00 244/15 |
| 2010/0304856 | A1* | 12/2010 | Coleman | A63F 13/75 463/31 |
| 2010/0304862 | A1* | 12/2010 | Coleman | A63F 13/60 463/32 |
| 2011/0050732 | A1* | 3/2011 | Arrasvuori | G06F 17/30241 345/666 |
| 2012/0081529 | A1* | 4/2012 | Seo | H04N 7/183 348/61 |
| 2012/0256945 | A1 | 10/2012 | Kidron et al. | |
| 2013/0022233 | A1* | 1/2013 | Ma | G01S 5/16 382/103 |
| 2013/0116044 | A1* | 5/2013 | Schwartz | A63F 13/12 463/29 |
| 2013/0135344 | A1* | 5/2013 | Stirbu | G06F 17/30893 345/629 |
| 2013/0178257 | A1* | 7/2013 | Langseth | G06T 17/05 463/4 |
| 2013/0194306 | A1* | 8/2013 | Song | G06Q 10/047 345/633 |
| 2014/0195148 | A1* | 7/2014 | Erignac | G05D 1/0282 701/445 |
| 2016/0000303 | A1* | 1/2016 | Klein | A61B 6/12 600/103 |

\* cited by examiner

Real path

Virtual path (1)

(2)

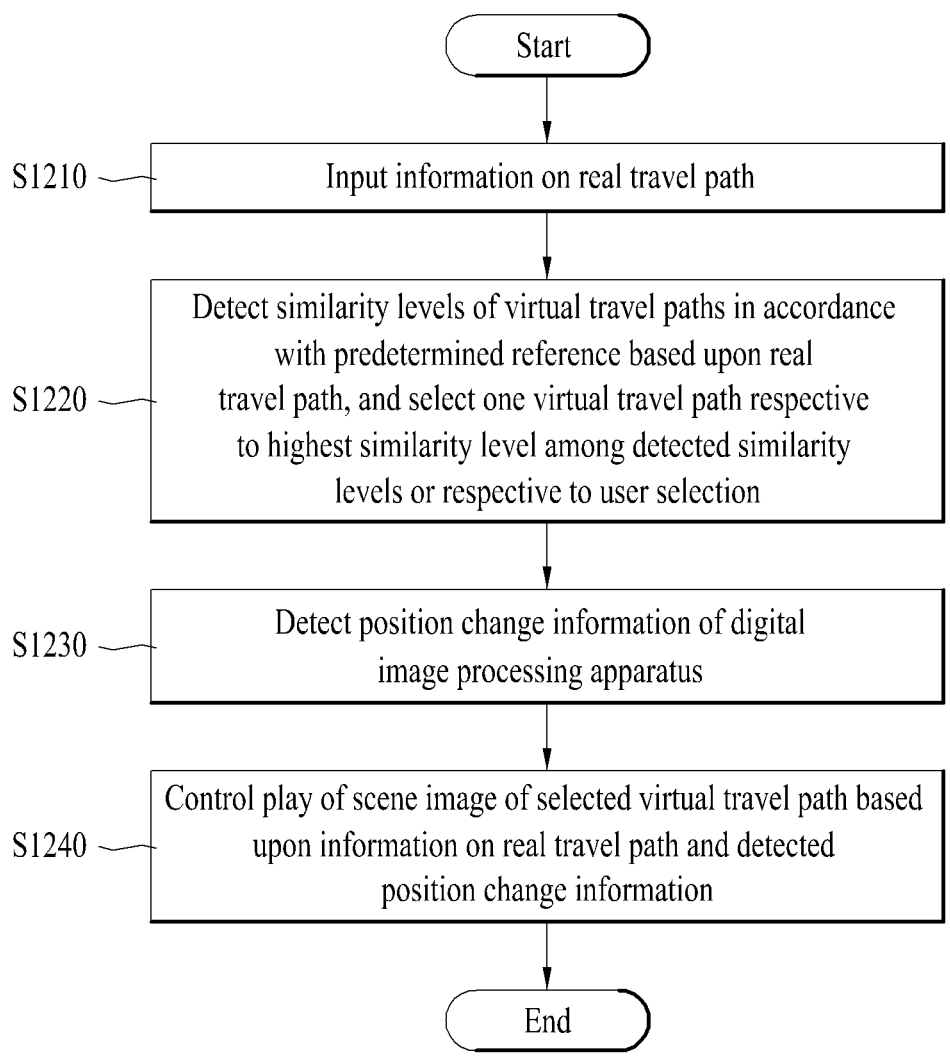

DIGITAL IMAGE PROCESSING APPARATUS AND CONTROLLING METHOD THEREOF

This application claims the benefit of the Korean Patent Application No. 10-2014-0083615, filed on Jul. 4, 2014, which is hereby incorporated by reference as if fully set forth herein.

BACKGROUND OF THE INVENTION

Field of the Invention

This specification relates to a digital image processing apparatus and a controlling method thereof.

Discussion of the Related Art

With the evolution in diverse means of transportation, people are now capable of travelling to a wanted destination by using a wide range of means of transportation. When travelling via means of transportation, people may enjoy an outside view (or landscape) through windows. Therefore, when people travel at long distances or visit a new region (or location), they may experience a pleasant travel while enjoying the view outside of the window.

However, when a person travels a same route regularly, the view outside the window is no longer pleasant and simply becomes a monotonous view. For example, many people commute to work using public transportation. And, most of the people commute to work almost at a consistent time schedule. And, public transportation that is used for commuting to work travels along the same path. Therefore, people commuting to work may find the view outside of the window dull and monotonous.

Moreover, in some public transportation, people cannot even look outside the window. For example, the subway travels along a path that is built underground. Therefore, people travelling by subway cannot enjoy any kind of view even if they wanted to.

Accordingly, a technology that can display a virtual scene (or scenery) by reflecting an actual (or real) travel environment to people using a means of transportation and, most particularly, public transportation.

SUMMARY OF THE INVENTION

Accordingly, this specification is directed to a digital image processing apparatus and a controlling method thereof that substantially obviate one or more problems due to limitations and disadvantages of the related art.

An object of this specification is to provide a digital image processing apparatus and a controlling method thereof that can play (or reproduce) a scene image (or scenery image) of a virtual path by reflecting a real travel environment.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of this specification, as embodied and broadly described herein, a digital image processing apparatus includes an input unit configured to receive information on a real travel path, a sensor unit configured to detect position change information of the digital image processing apparatus, a display unit configured to play a scene image of a virtual travel path, and a controller configured to control the input unit, the sensor unit, and the display unit. Herein, the controller may detect similarity levels of virtual travel paths in accordance with a predetermined reference based upon the real travel path, select one virtual travel path respective to a highest similarity level among the detected similarity levels or respective to a user selection, and control the play of a scene image of the selected virtual travel path based upon the information on the real travel path and the detected position change information.

Additionally, the control of the play of the scene image may indicate a control of a travel along the selected virtual travel path.

Moreover, the predetermined reference standard may include at least one of a travel path length, a travel path shape, and a travel path direction.

Meanwhile, the controller may compare at least one of length, shape, and direction between the virtual travel path and the inputted real travel path and may quantify the compared results, so as to detect a similarity level.

Meanwhile, the position change information may include at least one of speed information and direction information.

Meanwhile, the controller may control the play of the scene image of the selected virtual travel path in proportion to the detected speed information.

Additionally, the controller may divide each of the selected virtual travel path and the real travel path to multiple sections and may control the play of a scene image of each section of the virtual travel path corresponding to each respective section of the real travel path.

Also, the multiple sections may be configured to be spaced apart from one another at equal intervals.

Additionally, the multiple sections may be configured based upon at least one of stations, predetermined locations in a city, and turning points turning at predetermined turning angles or more.

Meanwhile, when the multiple sections are configured based upon stations, the controller may configure a number of stations on the real travel path to be equal to a number of stations used for configuring sections within the selected virtual travel path.

Additionally, when no position change of the digital image processing apparatus occurs, the controller may stop the play of the scene image respective to the selected virtual travel path.

Moreover, the controller may control the play of the scene image respective to the selected virtual travel path, based upon a ratio of a distance of the real travel path with respect to a distance of the selected virtual travel path.

Additionally, the ratio of the distance of the real travel path with respect to a distance of the selected virtual travel path may be configured based upon a point of departure and a point of arrival.

Also, the ratio of the distance of the real travel path with respect to a distance of the selected virtual travel path may be configured based upon an interval between stations within each travel path.

Also, the ratio of the distance of the real travel path with respect to a distance of the selected virtual travel path may be configured based upon a distance between turning points turning at more than a predetermined angle.

Also, the ratio of the distance of the real travel path with respect to a distance of the selected virtual travel path may be configured based upon a distance between predetermined location points within a city.

Meanwhile, the controller may control a time of arrival at a predetermined location point within the selected virtual travel path to be equal to a time of arrival at a point of arrival within the respective real travel path.

Additionally, when direction information of the digital image processing apparatus is detected to be deviating from the real travel path, the controller may change the selected virtual travel path in accordance with the detected direction information.

Also, the controller may control the play of the scene image respective to the changed virtual travel path based upon the changed virtual travel path.

In order to achieve the above-described technical object according to another exemplary embodiment, a controlling method of a digital image processing apparatus includes the steps of receiving information on a real travel path, detecting similarity levels of virtual travel paths in accordance with a predetermined reference based upon the real travel path and selecting one virtual travel path respective to a highest similarity level among the detected similarity levels or respective to a user selection, detecting position change information of the digital image processing apparatus, and controlling the play of a scene image of the selected virtual travel path based upon the information on the real travel path and the detected position change information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 illustrates a flow chart showing a controlling method of a digital image processing apparatus according to an exemplary embodiment.

DETAILED DESCRIPTION OF THE INVENTION

Figure 1:
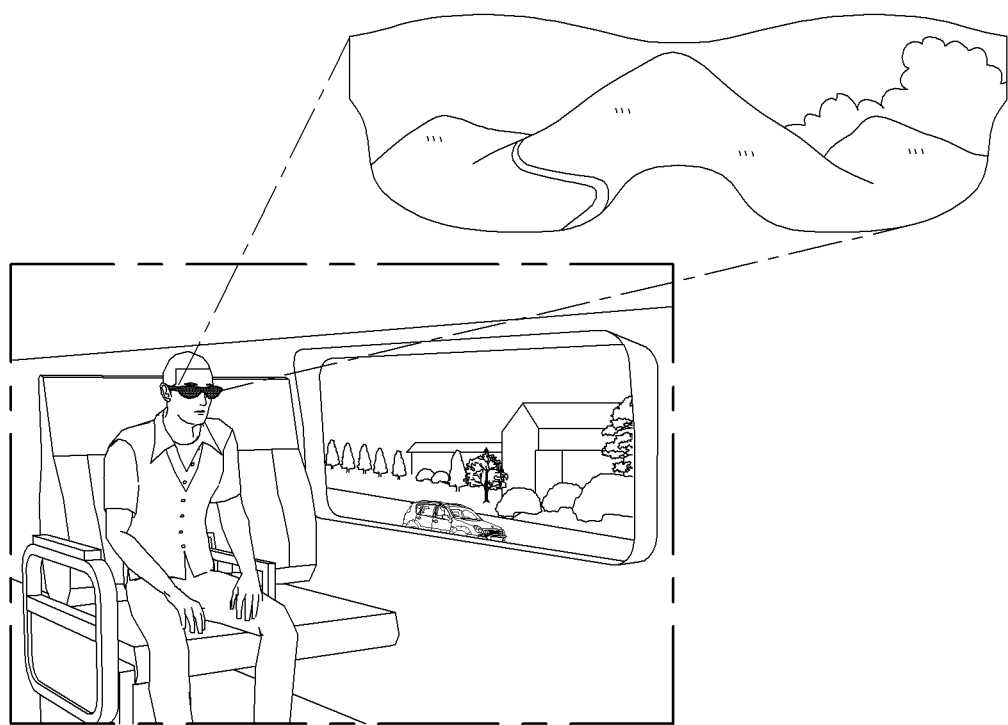
FIG. 1 illustrates an exemplary usage of a digital image processing apparatus according to an exemplary embodiment.

Hereinafter, preferred exemplary embodiments of the present invention that can best carry out the above-described objects of the preset invention will be described in detail with reference to the accompanying drawings. At this point, the structure or configuration and operations of the present invention, which are illustrated in the drawings and described with respect to the drawings, will be provided in accordance with at least one exemplary embodiment of the present invention. And, it will be apparent that the technical scope and spirit of the present invention and the essential structure and operations of the present invention will not be limited only to the exemplary embodiments set forth herein.

In addition, although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within.

FIG. 1 illustrates an exemplary usage of a digital image processing apparatus according to an exemplary embodiment.

Referring to FIG. 1, after boarding a train, a user may wear a digital image processing apparatus. Although the user is capable of viewing any urban scene (or scenery) outside of a window of the train, the user may also view a scene of a virtual travel path by using the digital image processing apparatus. The digital image processing apparatus may recommend diverse virtual travel paths to the user based upon a real (or actual) travel path, and, among the diverse virtual travel paths, the digital image processing apparatus may play a scene image of a selected virtual travel path.

The digital image processing apparatus may receive information on a real travel path from the user. For example, the digital image processing apparatus may receive from the user information indicating that a point of departure is Seoul, that a point of arrival (or destination) is Daejeon, and that a means of transportation is a train. When the digital image processing apparatus receives information on the point of departure, the point of arrival, and the means of transportation, the digital image processing apparatus may extract a real path of the user. In case of a train or an express bus, the real travel path may be easily extracted even if the digital image processing apparatus is only provided with information on the point of departure and the point of arrival. In some cases, the digital image processing apparatus may also acquire the real travel path information from a website (or Homepage) of the corresponding means of transportation.

Alternatively, the digital image processing apparatus may further receive information on a time of departure and type of train from the user. For example, in case the means of transportation is a train, train stops, travel speed, and so on, may very depending upon the time of departure or the train type. Therefore, if the digital image processing apparatus further receives additional information, the digital image processing apparatus may be capable of extracting more accurate real travel path information.

In some cases, the digital image processing apparatus may extract additional information by using time information corresponding to a time point at which the user inputs information or position information. For example, the digital image processing apparatus may acquire position information corresponding to an input time point at which the user inputs information by using a GPS signal, and so on. When the digital image processing apparatus determines that a current position of the user is a train station, the digital image processing apparatus may determine that the means of transportation used by the user is the train. Additionally, the digital image processing apparatus may also determine the time of departure based upon the time information corresponding to the input time point at which the user inputs information. In some cases, the digital image processing apparatus may also acquire information from means of transportation reservation information of the user.

Alternatively, the digital image processing apparatus may perform communication with a navigation system of the means of transportation, thereby being capable of receiving path information configured in the navigation system.

The digital image processing apparatus may search for a matching virtual travel path by using the extracted real travel path. Information on the virtual travel path may be stored in the digital image processing apparatus, and the corresponding information may also be stored in a server. The information on the virtual travel path may include information on shape (or form), distance, and direction, and so on, of the virtual travel path and scene data of the virtual travel path. Alternatively, basic data of the virtual travel path may be stored in the digital image processing apparatus, and the respective scene data may be stored in the server. In case the virtual travel path is stored in the server, the digital image processing apparatus may receive diverse types of virtual travel path data and respective scene data having a high level of similarity with the real travel path by sending a request to the server. Alternatively, the digital image processing apparatus may store only the basic data of the virtual travel path and may, then, search for a virtual travel path having a high level of similarity with the real travel path. Accordingly, the digital image processing apparatus may receive a Select command for selecting one of the virtual travel paths from the user. The digital image processing apparatus may receive scene data of the selected virtual travel path from the server and may play (or reproduce) the received scene data. A method for matching the real travel path and the virtual path will be described later on in more detail.

The digital image processing apparatus may play a scene image within the selected virtual travel path. The digital image processing apparatus may adjust scene image play speed of the virtual travel path based upon a distance ratio between the real travel path and the virtual travel path, the travel speed of the means of transportation, which the user is currently riding (or boarding), on the real travel path, and so on. The digital image processing apparatus may adjust the scene image play speed (or reproduction speed) of the virtual travel path, so that the play of the virtual travel path can be ended at a same time point as a time point when the means of transportation, which moves (or travels) along the real travel path, arrives at the destination (or point of arrival). Accordingly, the digital image processing apparatus may provide the user with a sensation that the user has traveled to the destination along the virtual travel path.

Provided above is a description of an exemplary usage of the digital image processing apparatus according to an exemplary embodiment. Hereinafter, a block view of the digital image processing apparatus will be described in detail.

Figure 2:
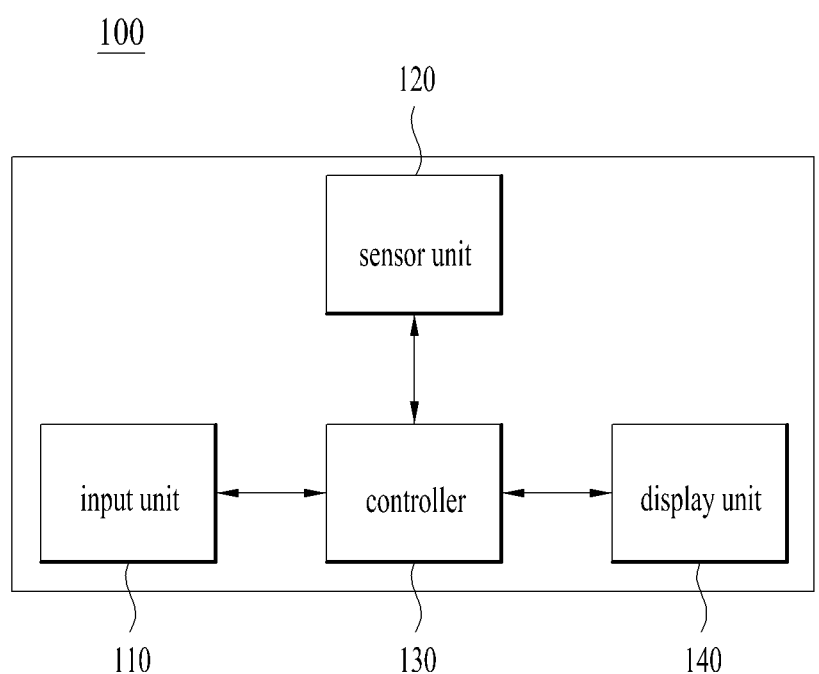
FIG. 2 illustrates a block view of a digital image processing apparatus according to an exemplary embodiment.

FIG. 2 illustrates a block view of a digital image processing apparatus according to an exemplary embodiment.

Referring to FIG. 2, the digital image processing apparatus 100 may include an input unit 110, a sensor unit 120, a controller 130, and a display unit 140.

The input unit 110 may be embodied by using diverse methods. For example, the input unit 110 may be embodied as a microphone, a virtual keyboard, an eye-detection sensor, and so on. In case the input unit 110 is embodied as a microphone, the digital image processing apparatus 100 may receive a command through the user's voice. And, in case the input unit 110 is embodied as a virtual keyboard, the digital image processing apparatus 100 may virtually display the virtual keyboard in an empty space, and, then, the digital image processing apparatus 100 may receive a command by recognizing the user's hand, which is located within a display space of the virtual keyboard. In case the digital image processing apparatus 100 is embodied as an eye-detection sensor, the digital image processing apparatus 100 may display an input key on the display unit 140, and, then, the digital image processing apparatus 100 may detect the eye-gaze of the user and determine that a key, which is located at a point where the user's eye-gaze is fixed, has been selected by the user.

Being embodied by using diverse methods, the input unit 110 may receive information on the real travel path. For example, the input unit 110 may receive information on a point of departure, a point of arrival (or destination), means of transportation, and so on. Alternatively, the input device 110 may also receive further information, such as a time of departure, detailed type of the selected means of transportation, estimated time of arrival (ETA), and so on. For example, the means of transportation may correspond to a train, an express bus, a city bus, and so on. In case the means of transportation corresponds to the train, the detailed type of the selected means of transportation may correspond to a rapid electronic railway, a limited express train, a regular train, a subway, and so on.

The sensor unit 120 may detect position change information of the digital image processing apparatus 100. The position change information may correspond to speed information, direction information, and so on, of the means of transportation that the user is currently boarding (or riding). The sensor unit 120 may detect a speed of the means of transportation, which travels (or moves) along the real travel path. Additionally, the input means 120 may detect a direction of the means of transportation, which travels along the real travel path. More specifically, the sensor unit 120 may deliver the user input or environment, which is recognized (or identified) by the digital image processing apparatus 100, by using multiple sensors being equipped to the digital image processing apparatus 100.

The sensor unit 120 may include multiple sensors. For example, the multiple sensors may include a gravity sensor, a geomagnetic (or terrestrial magnetism) sensor, a motion sensor, a gyroscope sensor, an acceleration sensor, an inclination sensor, a brightness sensor, an altitude sensor, an odor sensor, a temperature sensor (or thermal sensor), a depth sensor, a pressure sensor, a banding sensor, an audio sensor, a video sensor, a Global Positioning System (GPS) sensor, a touch sensor, and so on. The digital image processing apparatus 100 may detect speed or direction by using a variety of sensors.

The controller 130 may detect similarity levels of virtual travel paths in accordance with a predetermined reference based upon a real travel path. Then, the controller 130 may select one virtual travel path respective to a highest similarity level among the detected similarity levels. The predetermined reference may correspond to a length of the travel path, a shape (or form) of the travel path, a direction of the travel path, and so on. For example, if the controller 130 determines that the direction of the real travel path is headed south (or south bound), a southnorth bound virtual path may be searched as a similar virtual path. Alternatively, if the controller 130 determines that the form (or shape) of the real travel path corresponds to a circular shape (or form), a virtual travel path having a circular shape (or a circular virtual travel path) may be searched as a similar virtual path. Alternatively, the controller 130 may determine a length of the real travel path, so as to search a virtual path having a length that is most approximate to that of the real travel path may be searched as a similar virtual path.

In some cases, the controller 130 may add weight (or weight value) to multiple items among the length of the travel path, the form (or shape) of the travel path, the direction of the travel path, and so on, so as to search for a virtual path in an order that is most similar to the real travel path. The controller 130 may search only one of the most similar virtual paths, or the controller 130 may search multiple virtual paths based upon the level of similarity. In case multiple paths are searched, the user may select one virtual path. Alternatively, the virtual travel path may be selected by the user regardless of the similarity level.

The controller 130 may control the play of the scene image of the selected virtual travel path based upon the information on the real travel path and the detected position change information. For example, when the means of transportation, which the user is currently boarding is moving (or travelling) at a high speed, the controller 130 may detect the speed of the means of transportation and may play (or reproduce) the scene image at a high speed in proportion to the detected speed. As the user views the scene image that is being played, the user may experience a respective sense of speed. If the play speed of the scene image is fast, the user may have a sensation of moving (or travelling) at a fast speed along the virtual travel path. Conversely, if the play speed of the scene image is slow, the user may have a sensation of moving (or travelling) at a slow speed along the virtual travel path. More specifically, the control of the play speed of the scene image may signify the control of the travel speed along the selected virtual travel path, and the control of the play of the scene image may signify the control of the travel (or movement) along the selected virtual travel path.

The display unit 140 may play (or reproduce) the scene image of the virtual travel path. Additionally, the display unit 140 may also display an Input Menu or a Selection item, and so on.

Figure 3:
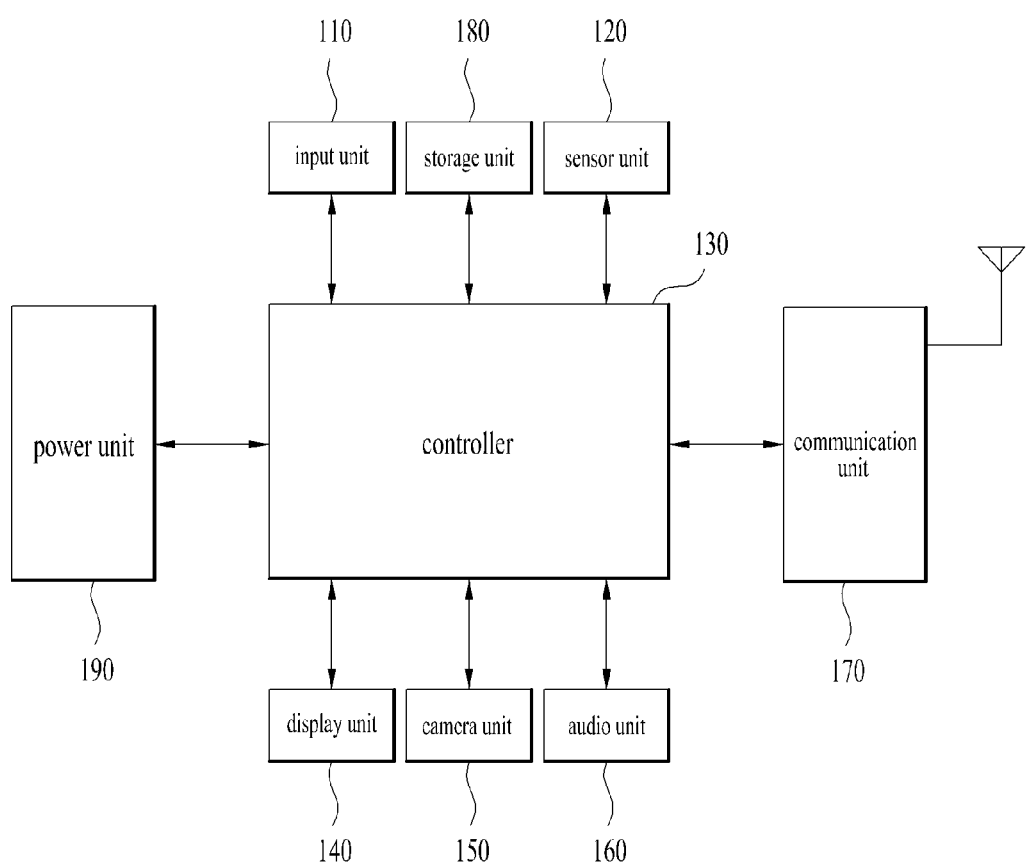
FIG. 3 illustrates a block view of a digital image processing apparatus according to another exemplary embodiment.

FIG. 3 illustrates a block view of a digital image processing apparatus according to another exemplary embodiment.

Referring to FIG. 3, the digital image processing apparatus may include an input unit 110, a sensor unit 120, a controller 130, a display unit 140, a camera unit 150, an audio unit 160, a communication unit 170, a storage unit 180, and a power unit 190.

The input unit 110, the sensor unit 120, the controller 130, and the display unit 140 have already been described above with reference to FIG. 2. And, therefore, detailed description of the same will be omitted for simplicity.

The camera unit 150 may capture (or take) still images (or photos) and record moving picture images. The camera unit 150 may also be used as the above-described motion sensor or video sensor.

The audio unit 160 may include a speaker, and the audio unit 160 may process sound including voice and may output the processed sound. The audio unit 160 analyze and process the voice that is inputted through the input unit 110, thereby being capable of recognizing (or identifying) the user's command. The recognized command may be delivered to the controller 130, so that the digital image processing apparatus can be controlled. The audio unit 160 processes the voice inputted by the user, the voice being related to the real travel path information, such as the point of departure, the point of arrival (or destination), and the means of transportation. Thereafter, the audio unit 160 may convert the processed voice to data that can be recognized by the digital image processing apparatus.

The communication unit 170 may perform communication with an outside of the digital image processing apparatus in order to transceive (transmit/receive) data by using diverse protocols. The communication unit 170 may transceive (transmit/receive) digital data by accessing an external network via wired or wireless communication. The communication unit 170 may perform communication with an external server in order to transmit real travel path information to a server and to receive data on a virtual travel path, which is similar to the real travel path, from the server.

The storage unit 180 may store diverse types of digital data, such as video data, audio data, still images (or photos), moving picture images, applications, and so on. The storage unit 180 may store data related to virtual travel paths. The data related to virtual travel paths include scene image information corresponding to the virtual travel path, such as direction, length, shape (or form), and so on. The storage unit 180 may only store travel path information, or the storage unit 180 may also store the scene image information along with the travel path information. In some cases, the storage unit 180 may also store data related to the received virtual travel path.

For example, the storage unit 180 may include a hard disk drive (HDD), a solid state drive (SSD), a compact disk (CD), a digital versatile disk (DVD), a Bluray disk, a floppy disk drive (FDD), a magnetic disk, a random access memory (RAM), a read-only memory (ROM), a memory card, a flash memory, a universal serial bus (USB) memory, and so on.

The power unit 190 corresponds to a power source, which is connected to an internal (or embedded) battery within the digital image processing apparatus or to an external battery, and which may supply power to the digital image processing apparatus.

Provided above is a description of a block view of the digital image processing apparatus according to an exemplary embodiment. Hereinafter, a method for searching for a virtual travel path that is similar to the real travel path will be described in detail.

Figure 4:
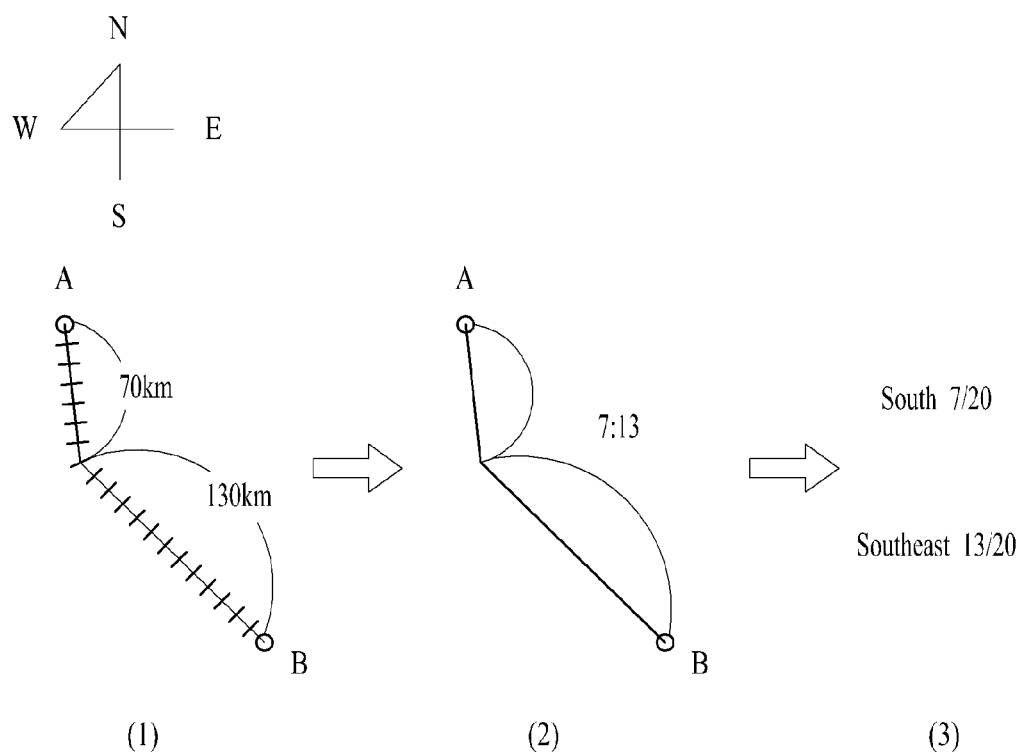
FIG. 4 illustrates a procedure for analyzing a real travel path according to an exemplary embodiment.

FIG. 4 illustrates a procedure for analyzing an actual (or real) travel path according to an exemplary embodiment.

Referring to FIG. 4(1), a real travel path is illustrated. As described above, the real travel path refers to a real path along which a user wearing the digital image processing apparatus is travelling (or moving). The point of departure of the real travel path corresponds to A, and the point of arrival (or destination) corresponds to B. The real travel path consists of approximately 70 kilometers (km) south bound and approximately 130 km southeast bound. Therefore, a total distance of the real travel path is equal to 200 km.

FIG. 4(2) illustrates a process of analyzing the real travel path in order to search for a similar virtual travel path. The analysis of the real travel path may be performed by the digital image processing apparatus or may be performed by the server. In case the analysis is performed by the server, the digital image processing apparatus may transmit information on the real travel path to the server.

A case when the digital image processing apparatus analyzes the real travel path will hereinafter be described in detail. The digital image processing apparatus may determine the direction. And, the digital image processing apparatus may determine that the real travel distance is south bound and southeast bound. Additionally, based upon the total travel distance, the digital image processing apparatus may determine that a south bound-to-southeast bound distance ratio corresponds to 7:13.

Referring to FIG. 4(3), a result of the analysis process (or analysis result) is illustrated. The digital image processing apparatus may analyze the real travel path as 7/20 south bound and 13/20 southeast bound, thereby being capable of searching for a virtual travel path having a similar direction, shape (or form), and so on. In some cases, the digital image processing apparatus may search for the virtual travel path by using the length of the real travel path instead of the distance ratio. More specifically, the digital image processing apparatus may search for a virtual travel path having a total distance of 200 km.

The digital image processing apparatus may search for a virtual travel path by using length, shape, or direction information of the real travel path. The digital image processing apparatus may compare the length, shape, or direction information between the virtual travel path and the inputted real travel path and may quantify the compared result, thereby detecting a level of similarity (or similarity level). The digital image processing apparatus may search for a virtual travel path indicating a highest similarity level.

For example, the digital image processing apparatus may search for a virtual travel path by using length and shape information of the travel path, and the digital image processing apparatus may add a weight of 0.8 to the path shape and a weight of 0.2 to the path length. The directions and distance of the real travel path respectively correspond to a south bound direction, a southeast bound direction, and 200 km. It will be assumed that a first virtual path having a distance of 200 km south bound and west bound, a second virtual path having a distance of 150 km south bound and east bound, and a third virtual path having a distance of 180 km south bound and southeast bound exist. A similarity level search method may be configured of giving 10 points when the direction matches, based upon the matching rate in the path direction, and decreasing 2 points for each angular difference of 45 degrees (45°), and also giving 10 point when the distance matches, based upon the matching rate in the path distance, and decreasing points in accordance with the distance ratio.

In case of the first virtual path, since the south bound direction matches, and since an angular difference between the west bound direction and the southeast bound direction corresponds to 135 degrees (135°), 10+4=14 points are given for the direction, and, since the distance corresponds to 200 km, 10 points are given. Therefore, by multiplying the given points by the respective weight, the first virtual path becomes equal to 13.2 points (=14*0.8+10*0.2 points). In case of the second virtual path, since the south bound direction matches, and since an angular difference between the east bound direction and the southeast bound direction corresponds to 45 degrees (45°), 10+8=18 points are given for the direction, and, since the distance corresponds to 150 km, 7.5 points are given. Therefore, by multiplying the given points by the respective weight, the second virtual path becomes equal to 15.9 points (=18*0.8+7.5*0.2 points). In case of the third virtual path, since the south bound direction matches, and since the southeast bound direction also matches, 10+10=20 points are given for the direction, and, since the distance corresponds to 180 km, 9 points are given. Therefore, by multiplying the given points by the respective weight, the second virtual path becomes equal to 17.8 points (=20*0.8+9*0.2 points).

Therefore, the digital image processing apparatus may search the third virtual path as the virtual path having the highest level of similarity. When the digital image processing apparatus searches one virtual travel path, the search and selection of the corresponding virtual travel path are performed at the same time. Alternatively, in accordance with the calculated similarity level points, the digital image processing apparatus may search and output virtual travel paths in the order of the third virtual path, the second virtual path, and the first virtual path. The digital image processing apparatus may also select a virtual path in accordance with the user's selection.

The above-described method is merely an exemplary embodiment for searching for a virtual travel path that is similar to the real travel path, and, therefore, the virtual travel path may be searched by using other variety of methods. Additionally, even when the server searched for the virtual travel path, the virtual travel path may be searched by similarly using the above-described method.

Figure 5:
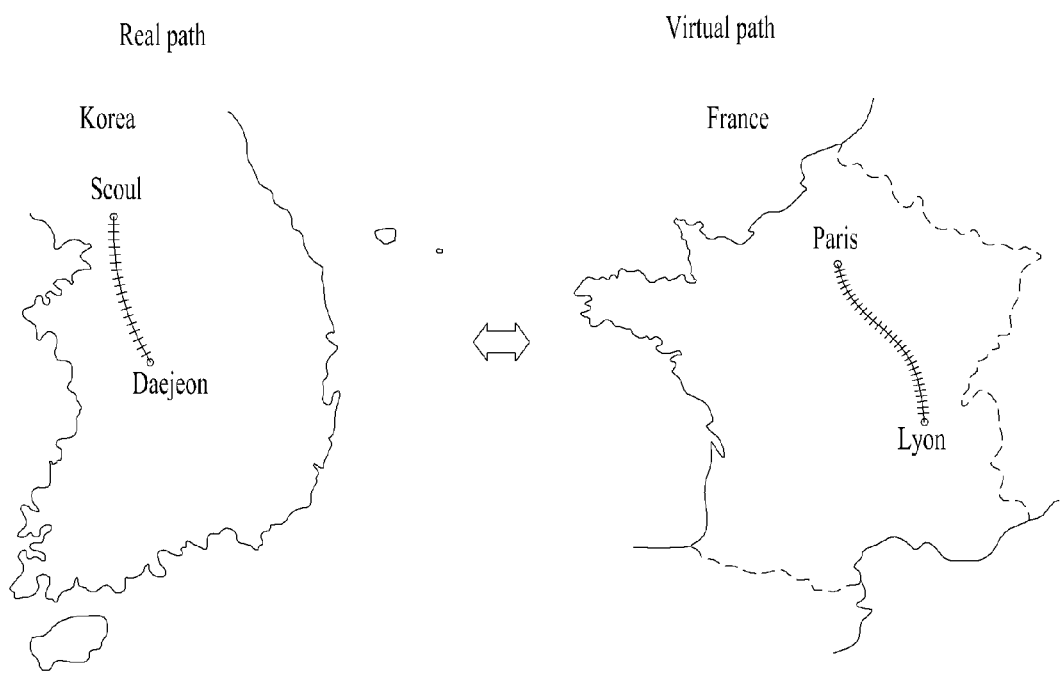
FIG. 5 illustrates a method for selecting a virtual travel path by using real travel path information according to an exemplary embodiment.

FIG. 5 illustrates a method for selecting a virtual travel path by using real travel path information according to an exemplary embodiment.

Referring to FIG. 5(1), a real travel path for travelling from Seoul to Daejeon is illustrated. As described above with reference to FIG. 4, the digital image processing apparatus may search for a virtual travel path that is similar to the real travel path after receiving real travel path information from the user. As shown in FIG. 5(1), the real travel path for travelling from Seoul to Daejeon corresponds to a southeast bound travel path. And, based upon the given real travel path information, the digital image processing apparatus may search for a similar virtual travel path. The information on the real travel path, which is used for determining the similarity level of a searched virtual travel path may include a length of the path, a shape (or form) of the path, a direction of the path, and so on.

Referring to FIG. 5(2), a virtual travel path, which is searched by the digital image processing apparatus, and which is similar to the real travel path is illustrated. As a virtual path that is similar to the southeast bound real travel path, which travels from Seoul to Daejeon, the digital image processing apparatus may search a southeast bound virtual travel path, which travels from Paris to Lyon.

When a virtual travel path is selected, the digital image processing apparatus may detect position change information of the digital image processing apparatus, which is travelling along the real travel path, and may adjust the play speed of a scene image respective to the selected virtual travel path. For example, the position change information may include speed information, direction information, and so on.

Figure 6:
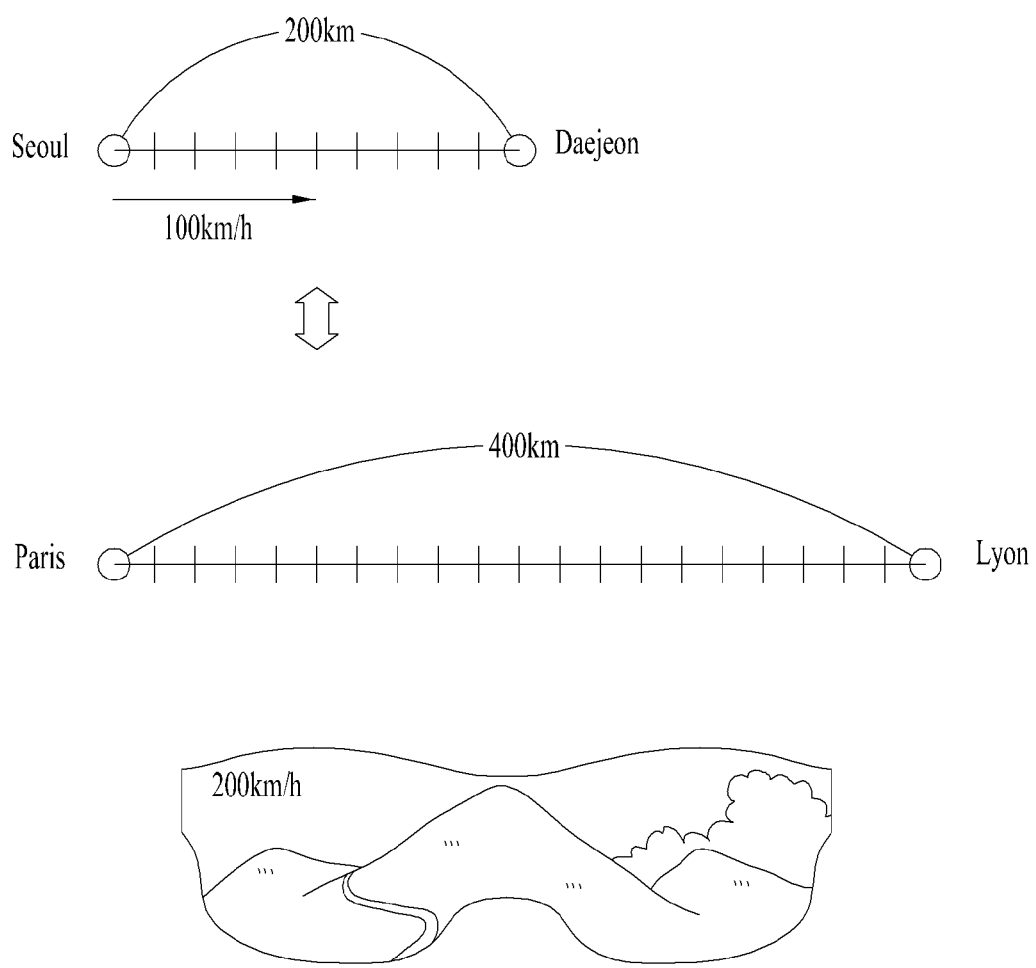
FIG. 6 illustrates a method for playing a scene image of a virtual travel path by using movement (or travel) information within the real travel path.

FIG. 6 illustrates a method for playing a scene image of a virtual travel path by using movement (or travel) information within the real travel path.

Referring to FIG. 6, a travelling state within a virtual travel path corresponding to the movement information (or travelling information) of the means of transportation, which is travelling along the real travel path. As described above, the movement state of the virtual travel path signifies a play state of the scene image respective to the selected virtual travel path displayed on the digital image processing apparatus. Herein, the user is currently boarding (or riding) the means of transportation while wearing the digital image processing apparatus. According to an exemplary embodiment, the means of transportation is presently travelling from Seoul to Daejeon at a speed of 100 kilometers per hour (km/h), and the distance between Seoul and Daejeon is 200 km.

The digital image processing apparatus may recognize (or identify) distance information of the real travel path between Seoul and Daejeon and may detect the current travel speed. Since the distance between Seoul and Daejeon is 200 km, and, since the distance between Paris and Lyon is 400 km, the distance of the virtual travel path is 2 times longer than the distance of the real travel path. Accordingly, the digital image processing apparatus may adjust the play speed of the scene image respective to the virtual travel path, so that the user can experience a travel speed of 200 km/h, which is 2 times faster than the detected travel speed of the real travel path, which corresponds to 100 km/h. The digital image processing apparatus may adjust the play speed of the scene image in accordance with a distance ratio between the distance of the real travel path and the distance of the virtual travel path. More specifically, the digital image processing apparatus may control the play of the scene image respective to the selected virtual travel path based upon a ratio of the distance of the real travel path with respect to the distance of the selected virtual travel path. The play speed of the scene image respective to the virtual travel speed signifies a travel speed at which movement (or travel) is carried out along the virtual travel path. For example, a travel speed travelling along the virtual travel path or the play speed of the scene image respective to the virtual travel path, which corresponds to 200 km/h, refers to a speed that is sensed by the user to be moving (or travelling) along the virtual travel path at a travel speed of 200 km/h. While playing the scene image respective to the virtual travel path, the digital image processing apparatus may also display the speed information, as shown in FIG. 6. In some cases, the digital image processing apparatus may also play the scene image without displaying the speed information.

If the real travel speed changes to 50 km/h, the digital image processing apparatus may adjust the play speed of the scene image respective to virtual travel path to 100 km/h. More specifically, the digital image processing apparatus may control the play speed of the scene image respective to the selected virtual travel path in proportion to the detected speed information. Additionally, in case the means of transportation, which the user is currently boarding, comes to a stop, the digital image processing apparatus may also stop the play of the scene image respective to the virtual travel path. More specifically, if there is no position change of the digital image processing apparatus occurring, the digital image processing apparatus may stop the play of the scene image respective to the selected virtual travel path.

The digital image processing apparatus may control the movement (or travel) along the virtual travel path in accordance with a time of departure and a time of arrival of the means of transportation, which the user is currently boarding. In other words, the digital image processing apparatus may control a play start time and a play end time of the scene image respective to the virtual travel path to coincide with the real time of departure and time of arrival of the means of transportation. For example, when the distance of the real travel path corresponds to 200 km, and when the real travel speed of the means of transportation corresponds to 100 km/h, the travelling time of the means of transportation for travelling to the destination (or point of arrival) is equal to approximately 2 hours. When the distance of the virtual travel path corresponds to 400 km, and when the digital image processing apparatus controls the play speed of the scene image respective to the virtual travel path, so that the user can experience a travel speed of 200 km/h, the travelling time to the destination along the virtual travel path is also equal to approximately 2 hours. Therefore, a running time of the scene image is equal to the travelling time of the means of transportation to the destination along the real travel path. More specifically, when the digital image processing apparatus starts playing the scene image respective to the virtual travel path at the same time as when the means of transportation starts to move (or travel) along the real travel path, the play of the scene image of the digital image processing apparatus may be ended when the means of transportation arrives at its destination. The digital image processing apparatus may control the play speed of the scene image, so that the time of arrival at a predetermined location point within the selected virtual travel path can be identical to a time of arrival at the point of arrival within the respective real travel path.

The ratio of the distance of the real travel path with respect to the distance of the selected virtual travel path may be configured based upon a point of departure and a point of arrival.

Figure 7:
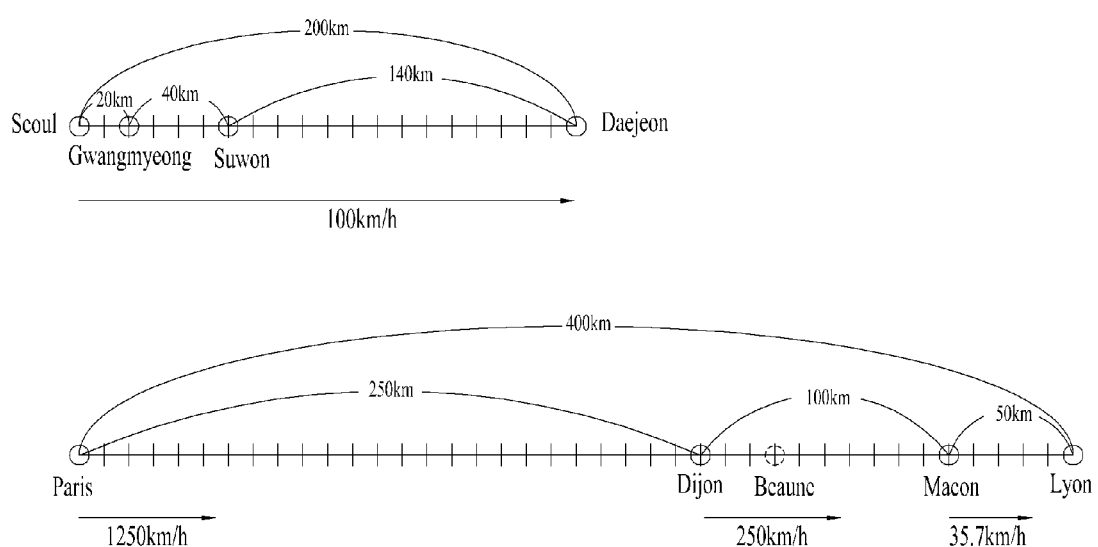
FIG. 7 illustrates a method for configuring a virtual travel path with respect to real travel path information according to a first exemplary embodiment.

FIG. 7 illustrates a method for configuring a virtual travel path with respect to real travel path information according to a first exemplary embodiment.

Referring to FIG. 7, a real travel path travelling from Seoul to Daejeon and a virtual travel path travelling from Paris to Lyon are illustrated. The digital image processing apparatus may divide each of the selected virtual travel path and the real travel path into multiple sections. The digital image processing apparatus may control the play of each section of the scene image respective to the virtual travel path based upon information on each corresponding section of the real travel path. The multiple sections may be configured based upon stations, predetermined location points within a city, turning points of at least a predetermined turning angle (or rotation angle) or more.

For example, when it is assumed that the means of transportation is travelling along the real travel path from Seoul to Daejeon, the means of transportation may stop at Gwangmyeong and Suwon. The digital image processing apparatus may receive information on the real travel path in order to be informed of information on stations at which the means of transportation is scheduled to stop. The digital image processing apparatus may configure the multiple sections based upon the information on the stations at which the means of transportation stops within the real travel path. In FIG. 7, the digital image processing apparatus may configure the real travel path to three different sections each corresponding to Seoul to Gwangmyeong, Gwangmyeong to Suwon, and Suwon to Daejeon. Based upon the real travel path information, the digital image processing apparatus may determine that the distance between Seoul and Gwangmyeong corresponds to 20 km, that the distance between Gwangmyeong and Suwon corresponds to 40 km, and that the distance between Suwon and Daejeon corresponds to 140 km.

When the multiple sections are configured based upon stations, the digital image processing apparatus may configure settings so that a number of stations at which the means of transportation is scheduled to stop within the real travel path can be equal to a number of stations for configuring sections within the selected virtual travel path. In FIG. 7, since the digital image processing apparatus has configured the real travel path to three sections, the digital image processing apparatus may also configure the virtual travel path to three sections. Accordingly, the digital image processing apparatus may configure two stopping points within the virtual travel path. In FIG. 7, within the virtual travel path from Paris to Lyon, three stations may exist: Dijon, Beaune, and Macon. In order to match the three stations of the virtual travel path with the sections of the real travel path, the digital image processing apparatus may remove one of the stations from the virtual travel path. More specifically, by removing the station Beaune from the virtual travel path, the digital image processing apparatus may configure the virtual travel path to three sections each corresponding to Paris to Dijon, Dijon to Macon, and Macon to Lyon.

The digital image processing apparatus may remove a stopping point within the virtual travel path in order to match the sections of the virtual travel path to the sections of the real travel path by using diverse methods. For example, the digital image processing apparatus may configure the real travel path and the virtual travel path, so that a distance ratio of sections of the real travel path with respect to the total real travel path is similar to a distance ratio of sections of the virtual travel path with respect to the total virtual travel path. Alternatively, the digital image processing apparatus may delete an arbitrary stopping point. Alternatively, the digital image processing apparatus may also configure settings in accordance with the user's selection. In case a number of stopping points of the virtual travel path is smaller than a number of stopping points of the real travel path, the digital image processing apparatus may insert an arbitrary stopping point within the virtual travel path.

When the means of transportation travels along the real travel path, the digital image processing apparatus may detect travel information (or movement information) of the means of transportation and may adjust the play speed of the scene image respective to the virtual travel path. The digital image processing apparatus may adjust the play speed of the scene image respective to the virtual travel path based upon the distance ratio of the distance of the virtual travel path with respect to the distance of the real travel path for each section. The digital image processing apparatus may configure a distance ratio of the distance of the selected virtual travel path with respect to the distance of the real travel path based upon a distance between the stations within each travel path.

For example, the means of transportation may travel at a speed of 100 km/h. And, the distance between Seoul and Gwangmyeong within the real travel path is 20 km, and the distance between Paris and Dijon within the respective virtual travel path is 250 km. Therefore, in order to configure settings so that the time consumed for travelling the respective sections can be equal, the digital image processing apparatus may play the scene image respective to the selected virtual travel path at a play speed that allows the user to experience travelling from Paris to Dijon at a travel speed of 1250 km/h. Additionally, the distance between Gwangmyeong and Suwon within the real travel path is 40 km, and the distance between Dijon and Macon within the respective virtual travel path is 100 km. Therefore, in order to configure settings so that the time consumed for travelling the respective sections can be equal, the digital image processing apparatus may play the scene image respective to the selected virtual travel path at a play speed that allows the user to experience travelling from Dijon to Macon at a travel speed of 250 km/h. Finally, the distance between Suwon and Daejeon within the real travel path is 140 km, and the distance between Macon and Lyon within the respective virtual travel path is 50 km. Therefore, in order to configure settings so that the time consumed for travelling the respective sections can be equal, the digital image processing apparatus may play the scene image respective to the selected virtual travel path at a play speed that allows the user to experience travelling from Macon to Lyon at a travel speed of 35.7 km/h.

Meanwhile, the digital image processing apparatus may configure the multiple sections of each of the real travel path and the virtual travel path to be spaced apart from one another at equal intervals. For example, in order to configure the real travel path from Seoul to Daejeon to be divided into four (4) sections, the digital image processing apparatus may configure a first location point corresponding to a location point 50 km from Seoul, a second location point corresponding to a location point 100 km from Seoul, and a third location point corresponding to a location point 150 from Seoul. Accordingly, the digital image processing apparatus may configure the real travel path to four (4) sections from Seoul to the first location point, from the first location point to the second location point, from the second location point to the third location point, and from the third location point to Daejeon. Additionally, in order to configure the virtual travel path from Paris to Lyon to be divided into four (4) sections, the digital image processing apparatus may configure a first location point corresponding to a location point 100 km from Paris, a second location point corresponding to a location point 200 km from Paris, and a third location point corresponding to a location point 300 from Paris. Accordingly, the digital image processing apparatus may configure the real travel path to four (4) sections from Paris to the first location point, from the first location point to the second location point, from the second location point to the third location point, and from the third location point to Lyon.

Figure 8:
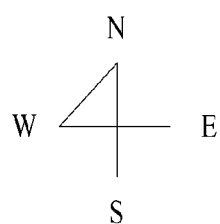
FIG. 8 illustrates a method for configuring a virtual travel path with respect to real travel path information according to a second exemplary embodiment.
Figure 8:
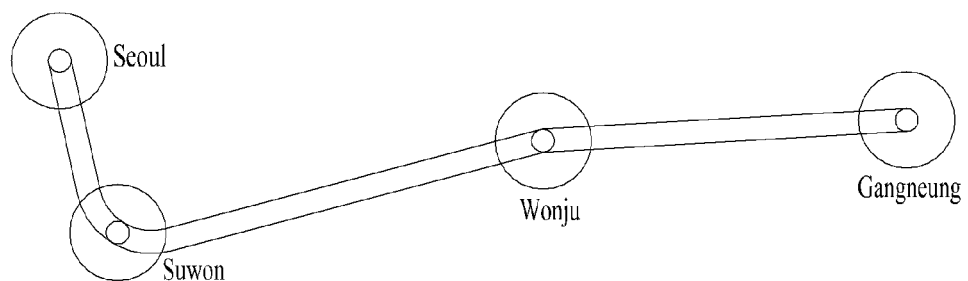
Figure 8:
Figure 8:
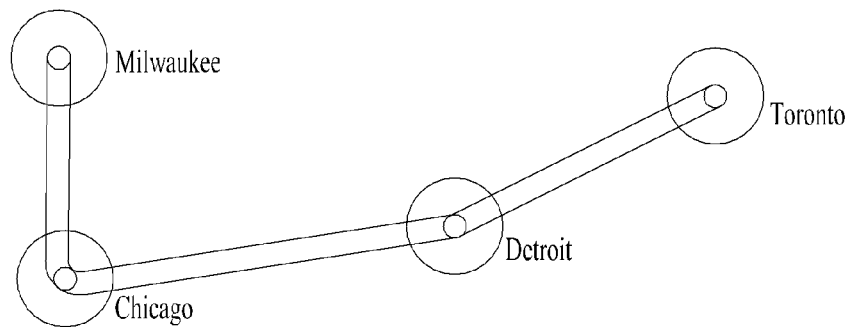

FIG. 8 illustrates a method for configuring a virtual travel path with respect to real travel path information according to a second exemplary embodiment.

Referring to FIG. 8, a real travel path travelling from Seoul to Gangneung and a virtual travel path travelling from Milwaukee to Toronto are illustrated. The digital image processing apparatus may divide each of the selected virtual travel path and the real travel path into multiple sections based upon a predetermined location point. The predetermined location point may correspond to a predetermined location point within a city. For example, a predetermined location point within a city may correspond to a central location point of the corresponding city, a central location point of a travel path included in the city region, a city boundary location point within the travel path, an arbitrary location point, and so on. The central location point of a city may refer to a central region based upon a city boundary in terms of an administrative district. The central location point of a travel path included in the city region may signify a central location point of two location points corresponding to a boundary starting location point and a boundary ending location point of city A within the travel path.

The digital image processing apparatus may configure multiple sections by using a turning point, where a turn (or rotation) is made at a predetermined turning angle (or rotation angle) or more as a location point for configuring a section. For example, the real travel path travels south bound and then turns east bound at Suwon. Accordingly, the digital image processing apparatus may configure Suwon as a location point. Additionally, the digital image processing apparatus may select a virtual travel path having a similar shape and may configure Chicago, which is a location respective to Suwon, as the corresponding location point.

The digital image processing apparatus may configure each of the real travel path and the virtual travel path to multiple sections based upon a predetermined location point of a city. For example, the real travel path may be configured of three sections, which correspond to Seoul to Suwon, Suwon to Wonju, and Wonju to Gangneung. And, with respect to the real travel path, the virtual travel path may also correspond to three sections, which correspond to Milwaukee to Chicago, Chicago to Detroit, and Detroit to Toronto.

A distance ratio of a distance of the real travel path with respect to a distance of the selected virtual travel path may be configured based upon a distance between predetermined location points of a city. For example, when the distance between Seoul and Suwon is 60 km, and when the distance between Milwaukee and Chicago is 150 km, the distance ratio may be configured as 6:15. More specifically, when the means of transportation travels from Seoul to Suwon at a travel speed of 60 km/h, the digital image processing apparatus may play the scene image respective to a section from Milwaukee to Chicago at a play speed providing a sensation of travelling at the speed of 150 km/h.

Figure 9:
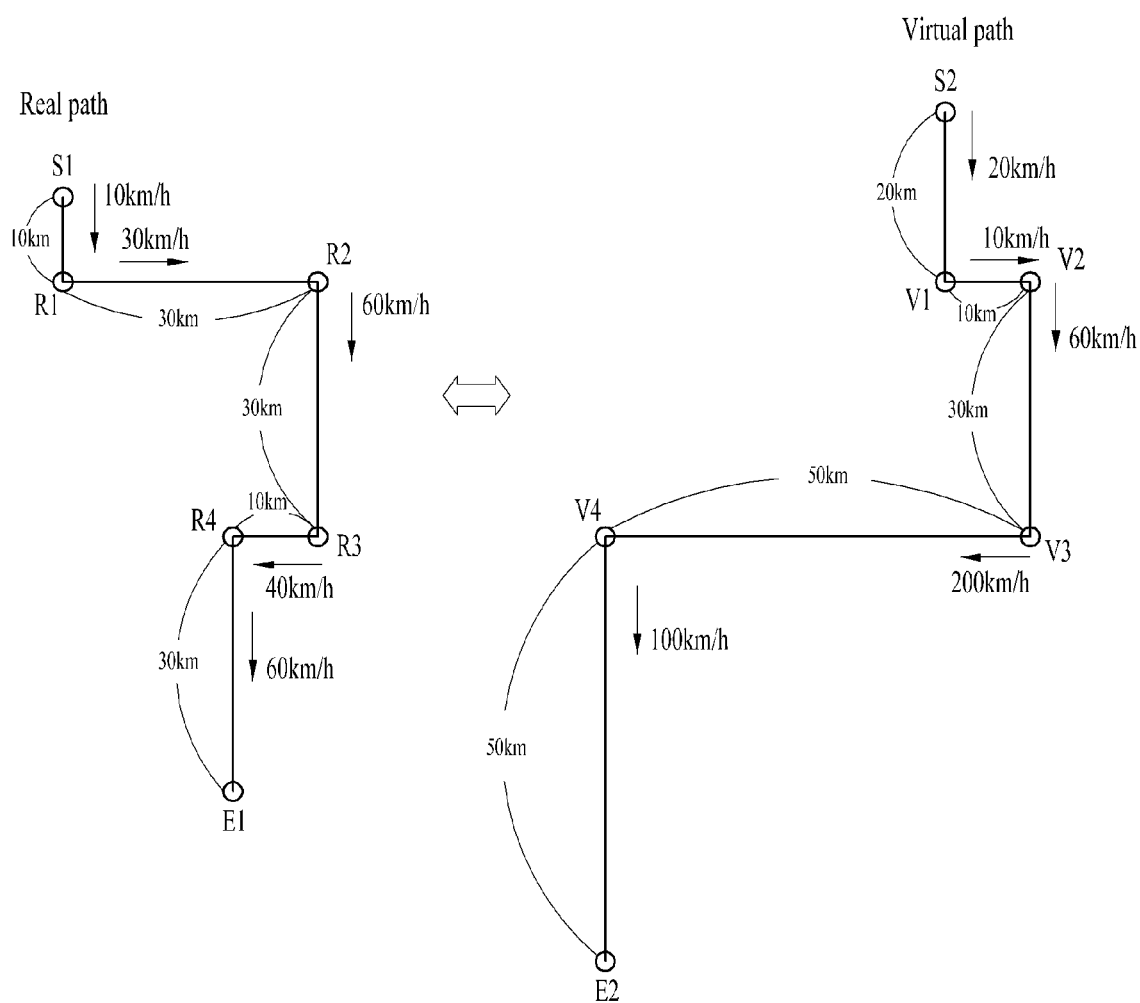
FIG. 9 illustrates a method for configuring a virtual travel path with respect to real travel path information according to a third exemplary embodiment.

FIG. 9 illustrates a method for configuring a virtual travel path with respect to real travel path information according to a third exemplary embodiment.

Referring to FIG. 9, a travel path configured of multiple sections based upon a turning point, where a turn (or rotation) is made at a predetermined turning angle (or rotation angle) or more, is illustrated. For example, the real travel path may correspond to a travel path that departs at S1 and turns leftward (or makes a left turn) at R1, turns rightward (or makes a right turn) at R2, turns rightward (or makes a right turn) at R3, turns leftward (or makes a left turn) at R4. The digital image processing apparatus may select a virtual travel path that is similar to the real travel path. More specifically, the virtual travel path may correspond to a path that departs at S2 and turns leftward (or makes a left turn) at V1, turns rightward (or makes a right turn) at V2, turns rightward (or makes a right turn) at V3, turns leftward (or makes a left turn) at V4.

The real travel path may correspond to a path that is guided by a navigation system, and the digital image processing apparatus may receive real travel path information from the navigation system, or the digital image processing apparatus may receive real travel path information from the user.

A distance ratio of the distance of the selected virtual travel path with respect to the distance of the real travel path may be configured based upon a distance between turning points where turns are respectively made at predetermined turning angles or more. For example, within the real travel path, a section from S1 to R1 corresponds to 10 km, and the means of transportation may travel along this section at a speed of 10 km/h, and a section from R1 to R2 corresponds to 30 km, and the means of transportation may travel along this section at a speed of 30 km/h. Additionally, a section from R2 to R3 corresponds to 30 km, and the means of transportation may travel along this section at a speed of 60 km/h, and a section from R3 to R4 corresponds to 10 km, and the means of transportation may travel along this section at a speed of 40 km/h, and a section from R4 to E1 corresponds to 30 km, and the means of transportation may travel along this section at a speed of 60 km/h.

Accordingly, the digital image processing apparatus may control a play speed of a scene image respective to the virtual travel path based upon the information on the real travel path. More specifically, since a section from S2 to V1 corresponds to 20 km, the digital image processing apparatus may play the scene image respective to this section at a play speed of 20 km/h, and, since a section from V1 to V2 corresponds to 10 km, the digital image processing apparatus may play the scene image respective to this section at a play speed of 10 km/h. Also, since a section from V2 to V3 corresponds to 30 km, the digital image processing apparatus may play the scene image respective to this section at a play speed of 60 km/h, and, since a section from V3 to V4 corresponds to 50 km, the digital image processing apparatus may play the scene image respective to this section at a play speed of 200 km/h, and, since a section from V4 to E2 corresponds to 50 km, the digital image processing apparatus may play the scene image respective to this section at a play speed of 100 km/h. The above-described play speed of the corresponding scene image indicates a travel speed sensation that the user may experience when it is assumed that the transportation means is actually (or really) travelling at the corresponding speed. In other words, the play speed of a scene image may indicate a travel speed within the selected virtual travel path.

In case the means of transportation does not move (or travel) along the predetermined route, the means of transportation does not always travel from the point of departure to the point of arrival along the real travel path. More specifically, the travel path may be altered while travelling on the road in accordance with a driver's decision (or choice).

Figure 10:
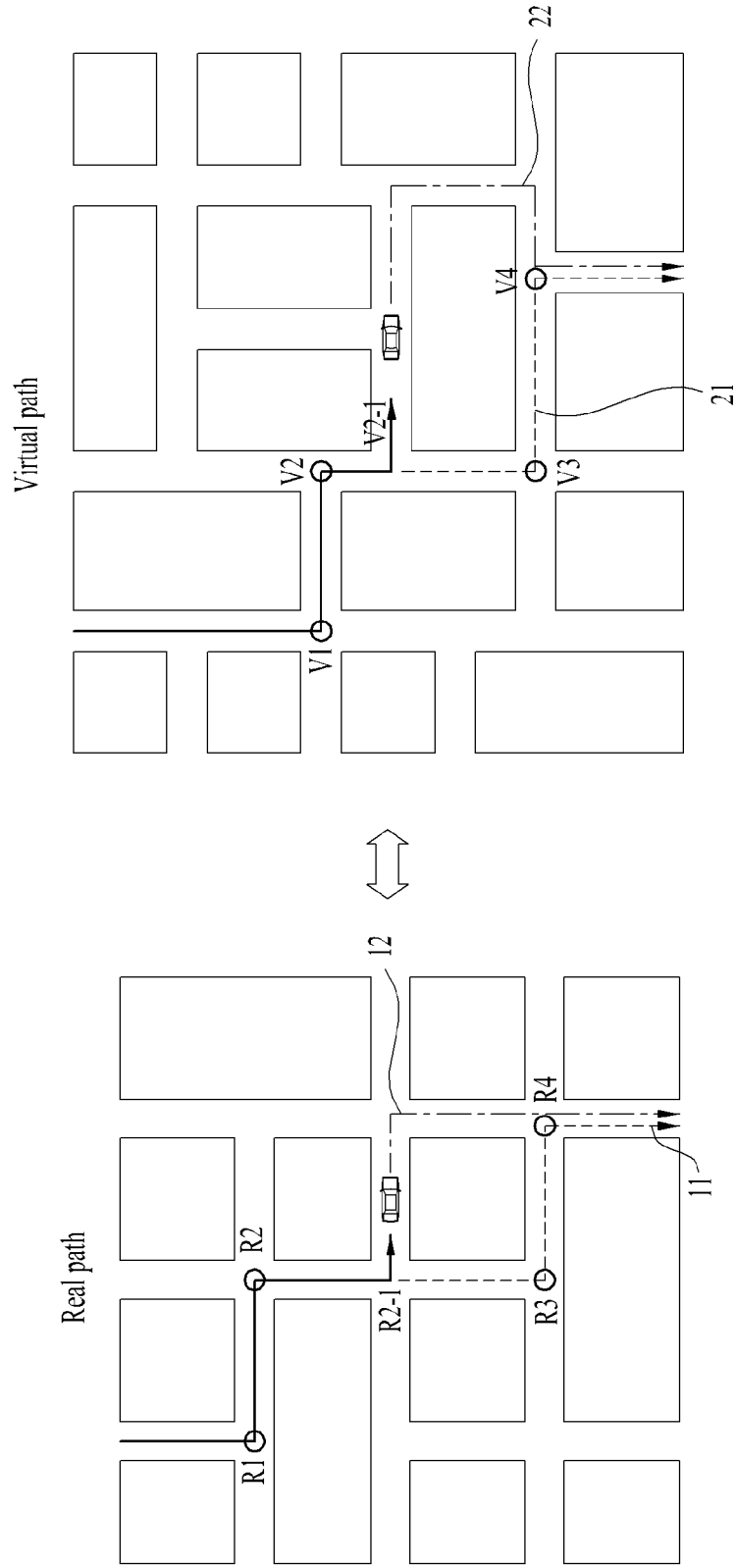
FIG. 10 illustrates a change in a virtual travel path with respect to a change in a real travel path according to an exemplary embodiment.

FIG. 10 illustrates a change in a virtual travel path with respect to a change in a real travel path according to an exemplary embodiment.

Referring to FIG. 10, a real travel path and a virtual travel path are illustrated, and an example of the means of transportation deviating from the scheduled real travel path is illustrated herein. For example, the scheduled real travel path 11 may correspond to a travel path that makes a left turn at R1, makes a right turn at R2, makes a left turn at R3, and makes a right turn at R4. Thereafter, the digital image processing apparatus may select a virtual travel path 21, which corresponds to a path that makes a left turn at V1, makes a right turn at V2, makes a left turn at V3, and makes a right turn at V4, and which is similar to the scheduled real travel path 11.

However, the means of transportation may deviate from the scheduled real travel path 11 at location point R2-1. When the means of transportation deviates from the scheduled real travel path 11, the navigation system may guide a changed real travel path 12.

The digital image processing apparatus may detect a deviation from the travel path by detecting the direction information. When the digital image processing apparatus detects direction information indicating that the means of transportation has deviated from the real travel path, the digital image processing apparatus may change the selected virtual travel path 21 in accordance with the detected direction information. More specifically, the digital image processing apparatus may receive information on the changed real travel path 12 from the navigation system. The digital image processing apparatus May change the scheduled virtual travel path 21 based upon the received information on the changed real travel path 12. Alternatively, the digital image processing apparatus may independently configure a new virtual travel path 22 for travelling to the destination (or point of arrival) along the virtual travel path based upon the deviation point and the direction information. Although the new virtual travel path 22 may be configured to be most approximate to the changed real travel path 12, due to differences in the distance, and so on, the new virtual travel path 22 may be configured to have a relatively different shape.

Based upon the newly changed virtual travel path 22, the digital image processing apparatus may play scene images respective to the changed virtual travel path.

The means of transportation does not always make a 90 degrees (90°) turn within the real travel path. Therefore, a reference for a turning angle that can allow the digital image processing apparatus to determine whether or not a turn has been made is required.

Figure 11:
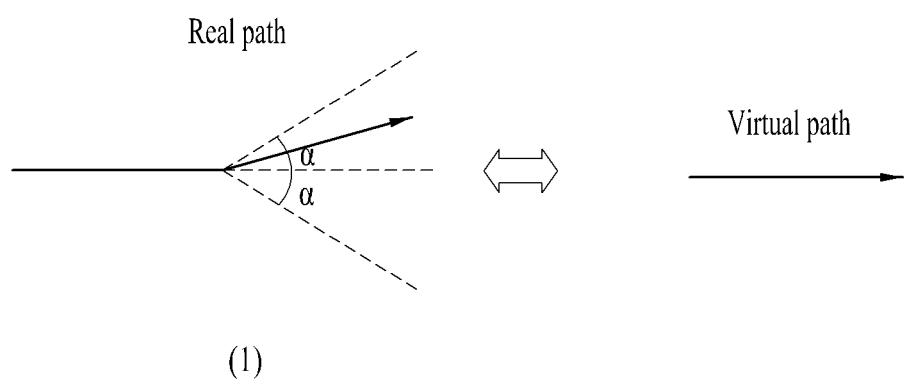
FIG. 11 illustrates a method of recognizing a virtual travel path with respect to a real travel path according to an exemplary embodiment.
Figure 11:
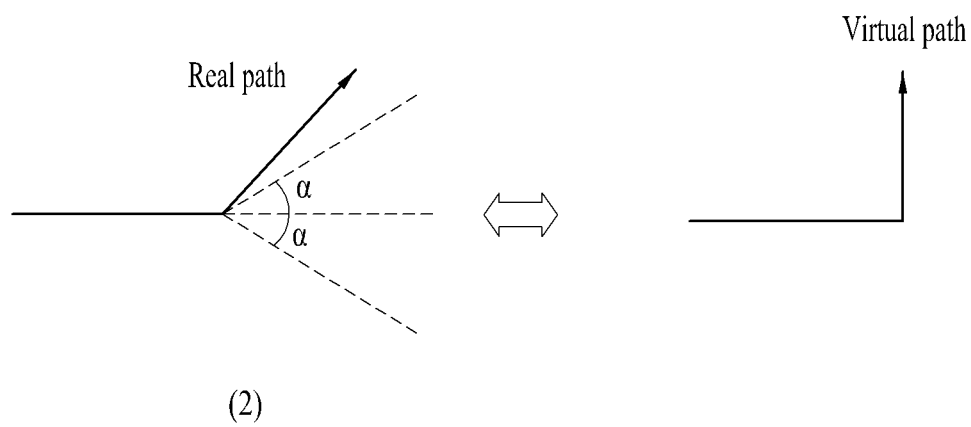

FIG. 11 illustrates a method of recognizing a virtual travel path with respect to a real travel path according to an exemplary embodiment.

Referring to FIG. 11(1), the digital image processing apparatus may configure an alpha angle. The alpha (α) angle may correspond to a threshold value determining whether or not a turn has been made. More specifically, when the means of transportation makes a turn equal to or smaller than the alpha (α) angle along the real travel path, the digital image processing apparatus may determine that a turn has not been made.

Referring to FIG. 11(2), an example when the means of transportation has made a turn equal to or larger than the alpha angle along the real travel path is illustrated. When the means of transportation has made a turn at a turning angle (or rotation angle) equal to or greater than the alpha angle, the digital image processing apparatus may determine that the means of transportation has made a turn. For example, when the means of transportation has made a left turn at a turning angle equal to or greater than the alpha angle, the digital image processing apparatus may determine that the means of transportation has made a 90° left turn (or turned leftward at 90°) and may decide the travel direction of the virtual travel path accordingly. However, instead of always determining that the means of transportation makes a 90° turn, in accordance with the direction and shape of the virtual travel path, the digital image processing apparatus may also determine that the means of transportation has made a turn at an angle smaller than 90° or greater than 90°.

Provided above is a description of diverse exemplary embodiments of the digital image processing apparatus for playing a scene image respective to a virtual travel path based upon the real travel path. Hereinafter, a flow chart of the digital image processing apparatus will be described in detail.

FIG. 12 illustrates a flow chart showing a controlling method of a digital image processing apparatus according to an exemplary embodiment.

The digital image processing apparatus may receive information on the real travel path (S1210). Information on the real travel path may correspond to distance, shape, direction, and so on, of the travel path.

The digital image processing apparatus may detect similarity levels of virtual ravel paths in accordance with a predetermined reference based upon the real travel path information, and, then, the digital image processing apparatus may select one virtual travel path respective to a highest similarity level, among the detected similarity levels, or respective to the user's selection (S1220). The predetermined reference may correspond to at least one of distance, shape, and direction of the travel path, or, in case multiple items are being used, a weight may be applied to each item. The similarity level between the real travel path and a virtual travel path may be quantified and detected, and the digital image processing apparatus may search and select a virtual travel path having the highest similarity level. Alternatively, the digital image processing apparatus may output multiple virtual travel paths by an order of the detected similarity levels and may select one of the virtual travel paths in accordance with the user's selection.

The digital image processing apparatus may detect position change information of the digital image processing apparatus (S1230). Herein, the position change information may correspond to at least one of the detected speed information and direction information.

The digital image processing apparatus may control the play of a scene image respective to the selected virtual travel path based upon the information on the real travel path and the detected position change information (S1240). The digital image processing apparatus may also control the play speed of the scene image respective to the virtual travel path so that the estimated time of arrival of the real travel path can be identical to the estimated time of arrival of the virtual travel path.

The digital image processing apparatus and the controlling method thereof according to this specification will not be limited only to the configuration and method according to the above-described exemplary embodiments. And, therefore, the digital image processing apparatus and the controlling method thereof according to this specification may be diversely varied and modified by an optional combination of all or part of each exemplary embodiment.

Meanwhile, a controlling operation method of a digital image processing apparatus of this specification may be implemented as processor-readable software in a storage medium, which can be read by the processor being equipped in the electronic device. The processor-readable storage medium includes all types of recording devices that are configured to store data that can be read by a processor. Examples of the processor-readable storage medium may include a ROM, a RAM, a CD-ROM, an electro-magnetic tape, a floppy disk, an optical data storage device, and so on. Furthermore, the processor-readable storage medium may also include storage media that can be realized in the shape of carrier waves, such as transmission via the Internet. Finally, the processor-readable storage medium may be dispersed to a computer system that is connected via network, thereby being capable of storing and executing processor-readable codes by using a dispersion method.

As described above, the digital image processing apparatus and the controlling method thereof have the following advantages. The digital image processing apparatus and the controlling method thereof may play a scene image of a virtual travel path by reflecting a real travel environment. Additionally, the digital image processing apparatus and the controlling method thereof may also change the virtual travel path when a real travel path is changed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital image processing apparatus, comprising:
   an input unit receiving user input information of a real travel path, wherein the user input information includes at least one of a point of departure, a point of arrival, a means of transportation, a departure time of a transportation and an arrival time of a transportation;
   a sensor unit including a Global Positioning System (GPS), the sensor unit detecting position change information of the digital image processing apparatus by using a GPS signal;
   a storage unit including a memory, the storage unit storing path information of the real travel path, path information of virtual travel paths and at least one scene image of the virtual travel paths, wherein the path information of the real travel path and the path information of the virtual travel paths respectively include travel path length, travel path shape, and travel path direction information;
   a display unit; and
   a controller controlling the input unit, the sensor unit, the storage and the display unit, wherein the controller is further:
      acquiring the path information of the real travel path corresponding to the user input information,
      detecting similarity levels of the virtual travel paths by comparing the travel path length, travel path shape, and travel path direction information between the real travel path and the virtual travel paths,
      selecting one virtual travel path respective to a highest similarity level among the detected similarity levels or respective to a user selection,
      calculating a travel speed by calculating the detected position change information of the digital image processing apparatus, and
      controlling the display unit to play the scene image of the selected virtual travel path for a user using the means of transportation and adjust a play speed of the scene image of the selected virtual travel path by multiplying the detected travel speed by a ratio of a distance of the selected virtual travel path to a distance of the real travel path,
   wherein, when the controller detected that the digital image processing apparatus deviates from the real travel path by comparing the detected position change information and the path information of the selected virtual travel path, the controller changes the selected virtual travel path in accordance with the detected position change information.

2. The apparatus of claim 1, wherein the controller quantifies the compared results to detect the similarity levels.

3. The apparatus of claim 1, wherein the controller divides each of the selected virtual travel path and the real travel path to multiple sections and controls the display unit to play a scene image of each section of the virtual travel path corresponding to each respective section of the real travel path.

4. The apparatus of claim 3, wherein the multiple sections are configured to be spaced apart from one another at equal intervals.

5. The apparatus of claim 3, wherein the multiple sections are configured based upon at least one of stations, predetermined locations in a city, and turning points turning at predetermined turning angles or more.

6. The apparatus of claim 5, wherein, when the multiple sections are configured based upon station, the controller configures a number of stations on the real travel path to be equal to a number of stations used for configuring sections within the selected virtual travel path.

7. The apparatus of claim 1, wherein, when no position change of the digital image processing apparatus occurs, the controller stops the display unit to play the scene image respective to the selected virtual travel path.

8. The apparatus of claim 1, wherein the distance of the real travel path and the distance of the virtual travel path are configured based upon the point of departure and the point of arrival.

9. The apparatus of claim 1, wherein the distance of the real travel path and the distance of the virtual travel path are configured based upon an interval between stations within each travel path.

10. The apparatus of claim 1, wherein the distance of the real travel path and the distance of the virtual travel path are configured based upon a distance between turning points turning at more than a predetermined angle.

11. The apparatus of claim 1, wherein the distance of the real travel path and the distance of the virtual travel path are configured based upon a distance between predetermined location points within a city.

12. The apparatus of claim 1, wherein the controller controls a time of arrival at a predetermined location point within the selected virtual travel path to be equal to a time of arrival at a point of arrival within the respective real travel path.

13. A controlling method of a digital image processing apparatus, the method comprising:
   receiving, via an input unit, user input information of a real travel path, wherein the user input information includes at least one of a point of departure, a point of arrival, a means of transportation, a departure time of a transportation, and an arrival time of a transportation;
   acquiring path information of the real travel path corresponding to the user input information, wherein the path information of the real travel path and path information of the virtual travel paths are stored at a storage, and the path information of the real travel path and the path information of the virtual travel paths respectively include travel path length, travel path shape and travel path direction information;
   detecting, via a controller, similarity levels of virtual travel paths by comparing the travel path length, travel path shape, and travel path direction information between the real travel path and the virtual travel paths;
   selecting, via the controller, one virtual travel path respective to a highest similarity level among the detected similarity levels or respective to a user selection;
   detecting, via a sensor unit including a Global Positioning System (GPS), position change information of the digital image processing apparatus by using a GPS signal; and
   controlling, via the controller, a display unit to play a scene image of the selected virtual travel path for a user using the means of transportation and adjust a play speed of the scene image of the selected virtual travel path by multiplying the detected travel speed by a ratio of a distance of the selected virtual travel path to a distance of the real travel path,
   wherein, when the controller detected that the digital image processing apparatus deviates from the real travel path by comparing the detected position change information and the path information of the selected virtual travel path, the controller changes the selected virtual travel path in accordance with the detected position change information.

* * * * *